Feb. 1, 1966  L. F. GUZIAK  3,232,899
RECONSTITUTABLE LATEX
Filed May 2, 1962
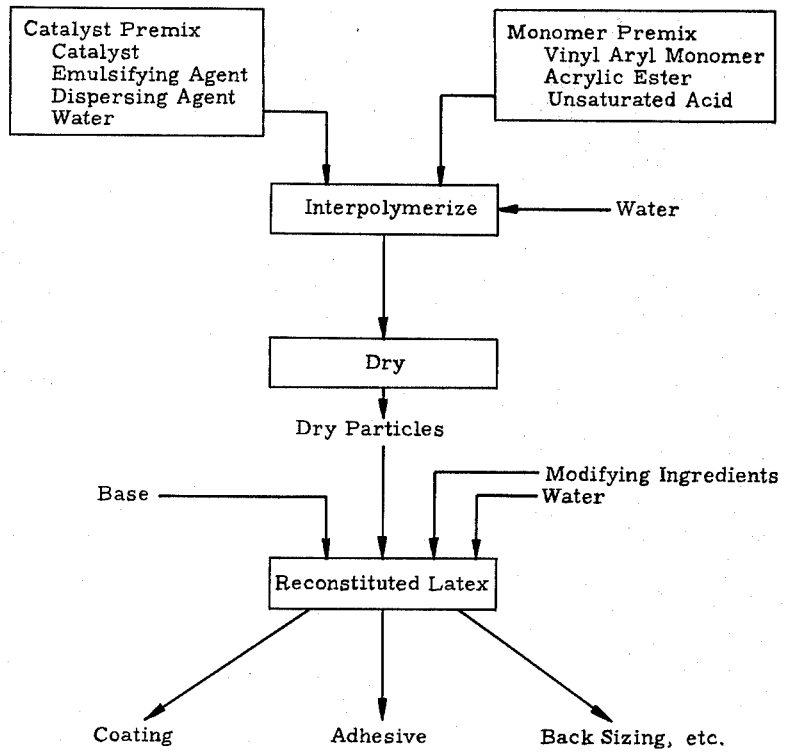
INVENTOR.
LEONARD F. GUZIAK
BY United States Patent Office 3,232,899
Patented Feb. 1, 1966

3,232,899
RECONSTITUTABLE LATEX
Leonard F. Guziak, Pittsburgh, Pa., assignor to Koppers Company, Inc., a corporation of Delaware
Filed May 2, 1962, Ser. No. 191,872
7 Claims. (Cl. 260—29.6)

This invention relates generally to synthetic latices, and more particularly, to a synthetic latex which can be dried and then reconstituted.

A synthetic latex is an aqueous dispersion of finely divided polymer particles or spheres. The dispersion may be stabilized by a surfactant or emulsifying agent and usually is stable for months or years. The polymer particles of such latex are usually perfect spheres and have an average size of 0.05 to 0.3 micron, the size being controlled to make the latex suitable for specific applications, such as, for paints, surface coatings, textiles, paper coatings, and the like.

The latex composition usually comprises from 20 to 70% solids and from 80 to 30% liquid medium. While the final composition which employs the latex is as an aqueous dispersion, nevertheless, the shipment of such large amount of water in order to obtain the desired solids is burdensome and costly.

An object of this invention, therefore, is to provide a polymer composition which is a dry powder for storage and transportation purposes, but which can be reconstituted to a latex for ultimate use, as in paint, adhesive composition, rug backing, paper coating and the like.

The novel latex of this invention is readily dried to a powder which can, at any time, easily be reconstituted upon the addition of water and a base to form again a latex. This invention contemplates a multi-polymer comprised of a major proportion of a vinyl aryl monomer and minor portions of a copolymerizable acrylic ester and a copolymerizable unsaturated acid. These monomers are copolymerized to produce a grain-free, coagulum-free latex, normally having a particle size of 0.1 to 0.3 micron. This latex can be dried to produce a powder that can be stored for an indefinite period of time; but the addition of water, which has its pH adjusted to the alkaline side, produces again a latex which has substantially the same particle size as the original product. A coalescing agent may be added to the reconstituted latex to ensure a continuous film upon drying. When the latex is again dried, the film shows no further tendency to be reconstituted.

The vinyl aryl monomer of this novel composition may be styrene, orthomethyl styrene, metamethyl styrene, paramethyl styrene, ethyl styrene, dimethyl styrene, alpha methyl styrene, parachlorostyrene, paramethoxy styrene and the like, parachlorostyrene, 2,4-dichlorostyrene, 2,5-dichlorostyrene, parabromostyrene, alphamethyl - paramethyl styrene, metaethyl styrene, paraisopropylstyrene, vinyl naphthalene, etc. Mixtures of two or more such compounds may be used if desired.

The unsaturated copolymerizable acrylic esters to be used in accordance with the present invention are straight-chain or branched-chain aliphatic alcohol esters of acrylic or methacrylic acid. The alcohol radicals should be saturated, should contain from 1 to 20 carbon atoms, and, in addition, the longest chain of the alcohol radicals should contain from 2 to 20 carbon atoms. If the alcohol radical contains a low number of carbon atoms, the resultant latices will dry to hard films that lack coalescence, i.e., continuous films will not be produced. An increase in the number of carbon atoms in the alcohol radical will impart an increased degree of coalescence to such films. On the other hand, if the alcohol radical contains a great number of carbon atoms or the number of carbon atoms in the longest continuous straight chain is excessive, the resultant latices will dry to form films which will be too soft and tacky for surface coating application. Within these limitations, a wide variety of acrylic and methacrylic acid esters may be used. Typical are the esters formed by esterifying acrylic or methacrylic acid with an alcohol, such as, ethyl alcohol, butyl alcohol, amyl alcohol, hexanol, 2-ethyl hexanol, 2-methyl pentanol, the oxo alcohol of an isobutylene dimer, heptyl alcohol, 3-methyl heptyl alcohol, the oxo alcohol of an isobutylene trimer, the oxo alcohol of a propylene dimer, the oxo alcohol of a propylene tetramer, cetyl alcohol, dodecyl-alcohol, tridecyl-alcohol, tetradecyl-alcohol, etc. Mixtures of such acrylic or methacrylic acid esters may be used if desired.

The unsaturated acid to be used in this novel composition must be one which will copolymerize with styrene. The acid component of the composition is preferably acrylic acid or methacrylic acid. Other acids such as cinnamic acid, atropic acid, crotonic acid, itaconic acid, fumaric acid, and maleic acid may be used as replacements in whole or in part or as mixtures of two or more such unsaturated carboxylic acids.

The latex of the present invention is produced by interpolymerizing the foregoing monomer components within a specific range of proportion. The vinyl aryl monomer contents should comprise by weight from 20 to 60 parts of total monomers, the unsaturated ester components should comprise from 10 to 40 parts, and the unsaturated acid should comprise from 15 to 40 parts. It has been found that as the vinyl aryl monomer/acrylate ester ratio is increased, the terpolymer tends to become harder, more brittle, and to show a decreasing tendency toward film coalescence. On the other hand, as this ratio is decreased the terpolymer tends to become soft, more tacky, and to show an increasing tendency toward film coalescence. The unsaturated carboxylic acid content should be from 15 parts to 40 parts. If less than 15 parts of acid be present, the water redispersible features seem to be lost; and if more than 40 parts be present, viscous opaque solutions are obtained upon addition of water and base due to the water soluble nature of the multipolymer product.

The polymerization of the monomer may be carried out by conventional aqueous emulsion polymerization reactions. Preferably, the monomers are premixed; the catalyst is premixed to form an aqueous solution or slurry; and then these two premixes are added to a charge of water in the reaction vessel.

The monomer premix is formed by mixing together the three components: monomer, ester, and acid. This can be done in a conventional manner.

The catalyst premix is comprised of the catalyst and the emulsifying and dispersing agents. Any of the conventional polymerization catalysts may be used such, for example, as potassium persulfate, benzoyl peroxide, lauroyl peroxide, ditertiary butyl peroxide, cumene hydroperoxide, azo-bis-isobutyronitrile, etc. Mixtures of two or more such polymerization catalysts may be used if desired. The amount of catalyst to be used is conventional and generally falls within the range from 0.01 to 1 part of polymerization catalyst per 100 parts of monomer mixture. Any of the conventional alkaline or neutral emulsifying agents may be used alone or in admixtures, such as, alkali metal salts of long-chain alkayl sulfates and sulfonates, ethylene oxide condensates of long-chained fatty acids, alcohols or mercaptans, sodium salts of sulfonated hydrocarbons, alkaryl sulfonates, etc. Representative emulsifiers include compounds such as, sodium lauryl sulfate, sulfosuccinic acid esters, the 2-ethylhexyl ester of sulfosuccinic acid, sodium salts of dioctyl sulfosuccinic acid, sodium salts of sulfated cetyl alcohol, sodium pyrophosphate , etc., alkyl aryl polyether alcohol.

The amount of water to be used in carrying out the emulsion polymerization may be varied within wide limits. It is generally preferable to use from about 1 to 3 parts of water per part of monomer mixture in order that the latex will have a solids content of from 50 to 25%. The amount of water, of course, may be increased or decreased to provide a latex having a higher or lower solids content.

The polymerization is advantageously carried out at a pH within the acid range, preferably, for example, in the range of 2.5 to 3.0.

The latex may be dried in any conventional manner, for example by spray drying, etc. Conveniently, the latex may be dried by depositing it on a glass plate and drying at ambient temperature; the dry polymer can then be removed from the glass. The dry polymer is a granular, free-flowing solid which is extremely stable and may be stored indefinitely, for months or years, in a dry atmosphere at room temperature.

To reconstitute the latex, the dried powder is merely mixed with water which has been made alkaline. Surprisingly, the particle size of the reconstituted latex is the same as the particle size of the latex that existed before the latex was dried to particles. This reconstituted latex can again be dried to a film. While this latter film is somewhat water sensitive, it is not redispersible in water a second time.

The amount of water used in redispersing the powder is not particularly critical and depends to a certain extent upon the size of the particle in the original latex and the final use for the latex. Small size particles tend to become thicker and more viscous so that a limitation appears in that instead of an aqueous dispersion, it becomes something in the nature of a paste. The solids content of latex normally ranges from 30 to 55%.

The pH of the water used for redispersing the latex is desirably between 8 and 10. Inorganic or organic bases may be used to adjust the pH of the water, for example, sodium hydroxide, ammonium hydroxide, potassium hydroxide, monoethanolamine and the like.

To improve the characteristics of the film resulting from the reconstituted latex, there may at this time be added various coalescing or film-forming aids.

The film-forming aid may be any of the conventional types such as water soluble glycols, triols, glycol ethers, etc. Examples are dipropylene glycol, butyl cellosolve, carbitol acetate, polyoxyethylene and the like.

The reconstituted latex dries to a continuous film which is thereafter not reconstitutable. The heating or baking of these films renders the films water and solvent resistant.

The general flow diagram for producing the novel reconstitutable latex of this invention is shown in the attached drawing.

The reasons for the novel redispersible characteristics of the terpolymer of this invention are not entirely known. It has been noted that when the material is cast upon glass as a film and then removed from the glass, the dried granular material is a coarse, gritty material with glistening particles, superficially resembling a crystalline material. The clarity and apparent crystallinity of the dried material strongly suggests that a measure of interparticle coalescence has occurred. This phenomena is postulated as being a case of limited particle coalescense. While the latices are not composed of unusually small particles, it seems possible that the interplay of forces upon drying of the latex might be such as to result in very large pressures being exerted on the particles as the aqueous phase disappears. The hydrostatic squeeze on a system of spheres 0.1 micron in diameter has been calculated to be approximately 80 atmospheres or 1200 pounds per square inch. This squeeze, coupled with surface forces in an evaporating film, could result in coalescence pressures of considerable magnitude. Although the polymer is dried at temperatures below the second order transition temperature, it is believed that the particles have sufficient plasticity to permit slight deformation on drying. The polar forces arising from the pressure on the particle surface of the surface active and the carboxyl groupings also tend to limit particle coalescence. Examination of the particles by electronic microscope shows that the original particles are restored upon being reconstituted with water. Thus it is most surprising that the insipient coagulum has not destroyed this particular feature of the polymeric dispersion, and all particles after redispersion have regained their original spherical shape. Evidently this is another indication of the semiplastic nature of the polymer and an indication of the magnitude of unknown forces which, after redispersion, tend to restore the particles to spherical shape.

The latices of the present invention are useful in the preparation of surface coating compositions. For such compositions, the latex is conventionally compounded with suitable pigments, fillers, protective colloid agents, thickening agents, latex stabilizing agents, etc. The latexes can be spread as a thin layer and dried upon a suitable supporting surface, e.g., of glass, steel or wood to obtain adherent continuous films.

The invention will be illustrated by the following examples:

EXAMPLE I

A monomer premix is formed by adding 55 parts styrene to 25 parts of 2-ethylhexyl arcylate and 20 parts of methacrylic acid together and stirring until a uniform mixture results. A catalyst and emulsifier premix is made by adding together 0.4 part potassium persulfate, 0.27 part potassium sulfate, 0.28 part sodium pyrophosphate, 2.55 parts of the sodium salt of alkyl aryl sulfonate as a 28% solids solution, 0.50 part of an alkyl aryl polyether alcohol and 32.3 parts of water. An initial charge of 70 parts of water is added to a glass-lined reaction vessel that is fitted with a reflux condenser and an agitator. The monormer premix and the catalyst premix are thereafter added continuously to this initial charge during a six-hour period while temperature is controlled at 88 to 92° C. The resulting product is a grain-free, coagulum-free latex that has a particle size of 0.1 to 0.3 micron.

A film of the latex is cast on a glass substrate and permitted to dry, the dried film being a discontinuous crazed film. The film is readily removed from the glass as a hard, clear, granular, dry particulate particle or powder. Microscopic examination at eightly times magnification shows this product to be small flakes or flat plates of the copolymer film.

Equal parts of the flat plates and water are mixed together, no physical change was noted. However, upon the addition of a small amount of sodium hydroxide, an instantaneous change in the mixture was noted. A milk-white reconstituted latex was obtained showing particle size of 0.1 to 0.3 micron. The reconstituted latex when cast upon glass formed a continuous film. This film was sensitive to water but showed no tendency to dissolve. When the reconstituted latex was cast on glass and heated to 100° C. for one-half hour, the resulting film was water resistant.

Electron micrographs of the particles in the original and in the reconstituted latex were as follows:

*Table I*

PARTICLE SIZE AVERAGES

| | $D_{vs}$ | $D_s$ | $D_n$ | $\dfrac{D_{vs}}{D_s}$ | $\dfrac{D_{vs}}{D_n}$ |
|---|---|---|---|---|---|
| Original | A. 1,280 | A. 920 | A. 830 | 1.39 | 1.54 |
| Reconstituted | 1,370 | 1,010 | 910 | 1.36 | 1.51 |

$$D_{vs}=\frac{\Sigma(nd^3)}{\Sigma(nd^2)}; \quad D_s=\left[\frac{\Sigma(nd^2)}{\Sigma n}\right]^{1/2}; \quad D_v=\left[\frac{\Sigma(na^3)}{\Sigma n}\right]^{1/3}$$

where $n$ is the number of particles of size $d$ measured.

EXAMPLE II

A portion of the dried latex from Example I was mixed with an equal weight of water containing 30 parts of a water soluble melamine-formaldehyde resin (Super Beckamine) and having a pH of 10.5. The resin was cast on glass and heated to 100° C. for one-half hour. The resulting film did not soften or swell in water, methyl ethyl ketone or aromatic gasoline. The adhesion of the film to the glass was excellent, and the Sward hardness of the film was 72 to 76% of that of polished glass.

EXAMPLE III

A portion of the dried latex from Example I was added to an equal weight of an aqueous solution containing 20 parts of a resorcinol-formaldehyde resin (Penacolite B-16) at a pH of 10.5. An aliquot of the resulting latex was cast as a film on glass. The film dried to a clear, light-brown colored continuous, craze-free film. To a second aliquot was added five parts of hexamethylene tetramine. This amine provided crosslinking to give an insoluble, infusible film upon heating the film to a temperature of 175° C. for thirty minutes.

EXAMPLE IV

To illustrate the characteristics imparted by varying the ratio of the unsaturated acid component of the monomer premix, the procedure of Example I was repeated using a monomer premix of 55 parts of styrene, X parts of methacrylic acid and 45–X parts of ethylhexyl acrylate. The following table illustrates the product characteristics where X was respectively 10, 15 and 25.

| Properties (at low pH) | Acid Content (percent by weight) | | | |
| --- | --- | --- | --- | --- |
|  | 10 | 15 | 20 | 25 |
| High conversion | Yes | Yes | Yes | Yes. |
| Low foam | Yes | Yes | Yes | Yes. |
| Mechanical stability | Yes | Yes | Yes | Yes. |
| Freeze-thaw stability | Yes | Yes | Yes | Yes. |
| Alum stability | Yes | Yes | Yes | Yes. |
| Calcium chloride stability | No | No | Yes | Yes. |
| Thickening at pH 10 | No | No | Yes | Yes. |
| Redispersibility | No | Yes | Yes | Yes. |
| Film formation | No | No | No | No. |

EXAMPLE V

The procedure of Example I was repeated using a monomer premix of 55 parts of styrene, 15 parts of methacrylic acid and 30 parts of 2-ethylhexyl acrylate. The resulting multipolymer was dried as a film on glass. The particles, when removed from the glass, had a grainy, particulate structure. The dry particles were then dissolved in an equal weight of water whose pH had been adjusted to 9.0 with dimethylethanolamine to produce a reconstituted latex. To this latex was added 5% by weight of dipropylene glycol. An aliquot of the latex was cast on glass and dried at room temperature; it formed a clear, continuous, craze-free film. A second aliquot was applied to cold rolled steel and baked at 100° C. for one-half hour; the baked film had good adhesion to the steel, was resistant to water and solvents, was flexible, and was impact resistant.

EXAMPLE VI

The procedure of Example I was repeated except that monomer concentration of 55 parts of styrene, 25 parts of 2-ethylhexyl acrylate, 20 parts of methacrylic acid were used, and 0.25 part of t-dodecyl mercaptan was included in the monomer mix. A comparable reconstitutable latex was formed.

EXAMPLE VII

The procedure of Example I was repeated except that 25 parts of ethyl acrylate was used in place of ethyl hexyl acrylate. A comparable product was obtained; however, the film resulting from the reconstituted product showed some limitation for coating applications in that high concentration of coalescing agent were required in order to obtain continuous films during the drying of the reconstituted latex at room temperature.

EXAMPLE VIII

The procedure of Example VI was followed except that 0.4 part of divinyl benzene was substituted for the t-dodecyl mercaptan. A comparable product was obtained.

EXAMPLE IX

The procedure of Example I was repeated except that the acrylic ester was not used so that the monomer mix consisted of 55 parts styrene and 45 parts of methacrylic acid. A viscous latex was obtained. Upon the addition of a 10% solution of potassium hydroxide, a clear, extremely viscous solution was obtained. Reconstitutability was not evident in this product that contained a high concentration of methacrylic acid. Instead, the salts of such copolymers are soluble in water.

EXAMPLE X

The procedure of Example I was rejected except that the monomers were used in the ratio of 55 parts styrene, 35 parts 2-ethylhexyl acrylate, and 10 parts methacrylic acid. The dried film showed no water redispersibility.

EXAMPLE XI

The procedure of Example I was repeated with a monomer premix consisting of 55 parts styrene, 30 parts butadiene and 15 parts methacrylic acid. The product, when cast on glass, formed a crazed film. The film was removed from the glass, crushed into small particles, and mixed with an equal weight of water having potassium hydroxide added thereto to provide a pH of 9.5. The dry copolymer upon stirring became a swollen, gelatinaceous mix.

EXAMPLE XII

The reconstituted latices of this invention show utility in the preparation of baked surface coatings for metals and for such use they are compounded with conventional pigments, fillers, protective colloids, thickening agents, latex stabilizers, etc.

The particles resulting from a latex that was made in accordance with the procedure of Example I, cast on glass, and dried, were stored for one month at ambient temperatures. Thereafter, 460 g. of the dried powder was added to 540 g. of water. The mixture was stirred while the pH was adjusted to 9.5 with monoethanol amine and an emulsion was obtained.

A pigment dispersion was prepared by grinding titanium dioxide (200 g.), dispersant (7.0 g.), tributyl phosphate (1.0 g.), dimethyl amino ethanol (2.0 g.) in water (80.0 g.) for 16 hours in a ball mill. To this pigment dispersion was added the above emulsion (688.0 g.), butyl cellosolve, 60% aq. (58.0 g.), and dimethyl amino ethanol, 50% aq. (15.0 g.). The resulting paint was cast as a three mil film on glass and on cold rolled steel. In each case, a hard, continuous coating was obtained. After baking the coating for 30 minutes at 135° C., these coatings showed resistance to water and aromatic solvents, and showed a Sward hardness of 30–35. The coatings on metal showed no failure to a 40 inch-pound impact test or to a flexibility test wherein the metal was bent on a 0.5 inch mandril.

EXAMPLE XIII

The reconstituted latices of this invention show utility in the preparation of baked surface coatings for metals and for such use they are compounded with conventional pigments, fillers, protective colloids, thickening agents, latex stabilizers, etc.

The particles resulting from a latex that was made in accordance with the procedure of Example I, cast on glass and dried, were stored for one month at ambient temperatures. Thereafter, 460 g. of the dried powder was added to 540 g. of water. The mixture was stirred while the pH was adjusted to 9.5 with monoethanol amine and an emulsion was obtained. The emulsion was then blended with sufficient water-soluble melamine-formaldehyde resin to give a ratio of solids of 4 parts copolymer latex to 1 part melamine-formaldehyde resin.

A pigment dispersion was prepared by grinding titanium dioxide (200 g.), a sodium salt of polymeric carboxylic acid (Tamol 731) as a dispersant (7.0 g.), tributyl phosphate (1.0 g.), dimethyl amino ethanol (2.0 g.) in water (80.0 g.) for 16 hours in a ball mill. To this dispersion was added the emulsion (688.0 g.), butyl cellosolve, 60% aq. (58.0 g.), and dimethyl amino ethanol, 50% aq. (15.0 g.). The resulting paint was cast as a film having a thickness of three mils on cold-rolled steel. The coating was baked for 30 minutes at 135° C. Such coating showed enhanced solvent resistance probably due to the crosslinkage of the copolymer and melamine-formaldehyde resin.

EXAMPLE XIV

The reconstituted latices of this invention show utility in the preparation of surface coatings for masonry, asbestos, shingles, etc., and for such use they are compounded with conventional pigments, fillers, protective colloids, thickening agents, latex stabilizers, etc.

Discrete particles were made from a latex that was prepared in accordance with the procedure of Example I, was cast on glass, and dried. The resulting particles were then stored for six months at ambient temperature. Four hundred and eighty grams of the dried powder were added to 520 grams of water. The mixture was stirred while the pH was adjusted to 9.5 with monoethanol amine, and an emulsion was obtained.

A pigment dispersion was prepared by grinding titanium dioxide (582 g.), calcium carbonate as the whiting (288 g.), diatomaceous earth (Celite 281) as a filler (93 g.), a sodium salt of polymeric carboxylic acid (Tamol) as a dispersant (15 g.), ethylene glycol (43 g.), a solution of a ditertiary acetylenic glycol in ethylene glycol (Surfynol) as a defoamer (0.5 g.), phenol mercuric acetate as a preservative (2.3 g.), and water (356 g.). To this pigment dispersion was added the above emulsion (902 g.), and a mixed thickener of hydroxyethyl cellulose (Cellosize) as a thickener (1.75% solids) and a polyacrylate (Acrysol ASE 60) to a viscosity of 78 Krebs units. The resulting paint showed a drying time, set to tack, of less than one-half hour and a drying time to harden of less than one hour. Glass panels were coated with a seven mil film of an alkyd primer followed by a three mil coating of the foregoing composition to a 10 mil total thickness and air dried at ambient temperature for 96 hours. The paint showed no failure after 500 brush cycles of scrubbing on a Gardner scrub tester.

EXAMPLE XV

The reconstituted latices of this invention also show utility in the preparation of paper coatings and for such use they are compounded with conventional pigments and adhesives.

In accordance with the procedure of Example I, a latex was prepared, cast on glass and dried to provide resulting particles which were then removed from the glass and stored for six months in a dry place at ambient room temperature. A component A was prepared by adding an equal weight of the particles to an equal weight of water whose pH had been adjusted to 10 by the addition of ammonium hydroxide. The mixture was then stirred to form an emulsion. To this emulsion was added three parts of an 18% solution of sodium caseinate. A component B was prepared by mixing 100 parts of coating clay, 0.3 part of tetrasodium pyrophosphate and 57 parts of an 18% solution of sodium caseinate. The mixing of components A and B gave a composition comprising approximately 50% solids and 18% total adhesive. This composition was applied to paper with a roller coater. The resulting paper then included about 10% by weight of coating. The I.G.T. printability (No. 2IPI ink) was 200 feet per minute.

EXAMPLE XVI

The reconstituted latices of this invention show utility in the preparation of textile sizings and rug backings and for such use they are compounded with conventional clays and whitings.

Particles were made according to the procedure of Example I by casting the latex on glass and drying. After the particles had been stored for six months at ambient temperature, 480 grams of the dried particles were added to 520 grams of water. The mixture was stirred while the pH was adjusted to 9.5 with monoethanol amine to form an emulsion. To this was added filler clay (3000 g.) and sodium pyrophosphate as a dispersant (3.0 g.). The resulting mixture was applied to a rug as a backing, thereby producing a backsizing of good stiffness, good aging characteristics, good color retentions after heat treatment, good wearing properties, and high resistance to abrasion.

EXAMPLE XVII

The reconstitutable latices of this invention show utility as the dry ingredient in cement or mortar mixtures.

A dry premix was made of equal parts of cement, lime, and the dry latex particles (prepared in accordance with Example I). Upon the addition of water, the lime caused a change in the pH with the subsequent formation of the reconstituted latex in situ. The resulting mortar had excelled working and hardening characteristics.

EXAMPLE XVIII

An equal part of cement and lime was mixed with 0.5 part of the dry latex solids that had been prepared according to the procedure of Example I. Sufficient water was added to this dry mix and the slurry was agitated to obtain a thin paste. As a coating on cinder block, this product had good aging characteristics, resistance to abrasion, and improved water resistance. Similar improvements were gained when the dry latex was incorporated into dry mortar prior to use.

The foregoing has presented a novel polymer that can be produced as a latex, then dried to particulate particles, and thereafter reconstituted as a latex when desired. The polymeric portion of the novel reconstituteble latex is formed by the polymerization of a vinyl aryl monomer, an unsaturated ester, and an unsaturated acid. This novel copolymer may be dried and stored indefinitely. At the time of use, water which has been made alkaline is added to the dried particles to form a latex. This latex may then be the component of useful articles, such as coatings, rug backings, water compositions, adhesives and the like. In accordance with this invention, the need for transporting the aqueous medium along with the solids portion of the latex is eliminated.

I claim:

1. Method of forming a product that is reconstitutable into a latex consisting essentially of the steps of: copolymerizing 20–60 parts of a vinyl aryl monomer, 10–40 parts of a copolymerizable alkyl acrylic ester wherein said alkyl contains from 1–20 carbon atoms and 15–40 parts of a copolymerizable unsaturated carboxylic acid in an acidic aqueous medium to produce an emulsion having a particle size of 0.1–0.3 micron, and thereafter drying the emulsion so formed to obtain dried polymer particles which are reconstitutable into a latex upon the addition of water and a base.

2. A process for making a reconstituted latex consisting essentially of the steps of drying an emulsion having a particle size of 0.1–0.3 micron, said emulsion consisting essentially of the copolymerization product of copolymerizing 20–60 parts of a vinyl aryl monomer, 10–40 parts of a copolymerizable alkyl acrylic ester wherein said alkyl contains from 1–20 carbon atoms and 15–40 parts of a copolymerizable unsaturated carboxylic acid in an acidic aqueous medium, to obtain dried polymer particles, adding water to said particles, said water being added in a sufficient amount to give a mixture having a solids content of from 30–55% by weight, and adding a base so as to adjust the pH of the mixture to between 8 and 10 to form said reconstituted latex.

3. A process for making a latex coating consisting essentially of the steps of drying an emulsion having a particle size of 0.1–0.3 micron, said emulsion consisting essentially of the copolymerization product obtained by: copolymerizing 20–60 parts of a vinyl aryl monomer, 10–40 parts of a copolymerizable alkyl acrylic ester wherein said alkyl contains from 1–20 carbon atoms and 15–40 parts of a copolymerizable unsaturated carboxylic acid in an acidic aqueous medium, to obtain dried polymer particles, thereafter adding water to said particles said water being added in a sufficient amount to give a mixture having a solids content of from 30–55% by weight, and adding a base so as to adjust the pH of the mixture to between 8 and 10 to form a reconstituted latex, and adding filler thereto to form a coating composition.

4. A material that is reconstitutable into a latex having a particle size of 0.1 to 0.3 micron upon the addition of water, said water being added in a sufficient amount to give a mixture having a solids content from 30–55% by weight and a base so as to adjust the pH of the mixture to between 8 and 10 consisting essentially of the dried particulate product of a latex having particles of a size of from 0.1 to 0.3 micron and formed by the copolymerization of 20–60 parts of a vinyl aryl monomer, 10–40 parts of a copolymerizable alkyl acrylic ester wherein said alkyl contains from 1–20 carbon atoms, and 15–40 parts of a copolymerizable unsaturated carboxylic acid in an aqueous medium.

5. The material of claim 4 wherein said copolymerizable unsaturated carboxylic acid is selected from the group consisting of acrylic acid and methacrylic acid.

6. A process for making a reconstituted latex consisting essentially of the steps of drying an emulsion having a particle size of 0.1–0.3 micron said emulsion consisting essentially of the copolymerization product of 20–60 parts of styrene, 10–40 parts of 2-ethyl-hexylacrylate and 15–40 parts of a copolymerizable unsaturated carboxylic acid selected from the group consisting of acrylic acid and methacrylic acid in an acidic aqueous medium so as to obtain dried polymer particles, adding water to said particles in a sufficient amount to give a mixture having a solids content of from 30–55% by weight and adding a base to said mixture to adjust the pH of said mixture to between 8 and 10 to form said reconstituted latex.

7. A material that is reconstitutable into a latex having a particle size of 0.1–0.3 micron upon the addition of water, said water being added in a sufficient amount to give a mixture having a solids content of from 30–55% by weight and a base so as to adjust the pH of the mixture to between 8 and 10 consisting essentially of the dried particulate product of a latex having particles of a size of from 0.1–0.3 micron and formed by the copolymerization of 20–60 parts of styrene, 10–40 parts of 2-ethylhexylacrylate and 15–40 parts of a copolymerizable unsaturated carboxylic acid selected from the group consisting of acrylic acid and methacrylic acid in an acidic aqueous medium.

References Cited by the Examiner
UNITED STATES PATENTS

| | | | |
|---|---|---|---|
| 2,795,564 | 6/1957 | Conn et al. | 260—80.5 |
| 2,800,463 | 7/1957 | Morrison | 260—29.6 |
| 2,918,391 | 12/1959 | Hornibrook | 260—29.6 |
| 2,962,465 | 11/1960 | Lindstrom et al. | 260—29.6 |
| 3,104,234 | 9/1963 | Bray | 260—17 |

WILLIAM H. SHORT, *Primary Examiner.*

J. NORRIS, *Assistant Examiner.*

UNITED STATES PATENT OFFICE
CERTIFICATE OF CORRECTION

Patent No. 3,232,899                          February 1, 1966

Leonard F. Guziak

It is hereby certified that error appears in the above numbered patent requiring correction and that the said Letters Patent should read as corrected below.

Column 2, line 63, for "alkayl" read -- alkyl --; column 4, line 40, for "monormer" read -- monomer --; column 5, lines 1 to 3, the right-hand equation, for that portion reading "$(na^3)$" read -- $(nd^3)$ --.

Signed and sealed this 1st day of August 1967.

(SEAL)
Attest:

Edward M. Fletcher, Jr.                          EDWARD J. BRENNER
Attesting Officer                                Commissioner of Patents